United States Patent
Mikheev et al.

(10) Patent No.: US 9,875,232 B2
(45) Date of Patent: Jan. 23, 2018

(54) METHOD AND SYSTEM FOR GENERATING A DEFINITION OF A WORD FROM MULTIPLE SOURCES

(71) Applicant: YANDEX EUROPE AG, Lucerne (CH)

(72) Inventors: Andrey Nikolaevich Mikheev, Moscow (RU); Andrei Igorevich Shevchenko, Saint-Petersburg (RU)

(73) Assignee: YANDEX EUROPE AG, Lucerne (CH)

( * ) Notice: Subject to any disclaimer, the term of this patent is extended or adjusted under 35 U.S.C. 154(b) by 0 days.

(21) Appl. No.: 15/108,824

(22) PCT Filed: Oct. 22, 2014

(86) PCT No.: PCT/IB2014/065542
§ 371 (c)(1),
(2) Date: Jun. 29, 2016

(87) PCT Pub. No.: WO2015/162464
PCT Pub. Date: Oct. 29, 2015

(65) Prior Publication Data
US 2016/0335248 A1 Nov. 17, 2016

(30) Foreign Application Priority Data
Apr. 21, 2014 (RU) .............................. 2014116104

(51) Int. Cl.
*G06F 17/27* (2006.01)
*G06F 17/30* (2006.01)
*G06F 17/28* (2006.01)

(52) U.S. Cl.
CPC ...... *G06F 17/2735* (2013.01); *G06F 17/2705* (2013.01); *G06F 17/30675* (2013.01);
(Continued)

(58) Field of Classification Search
CPC .................................................. G06F 17/2735
(Continued)

(56) References Cited

U.S. PATENT DOCUMENTS 6,651,220 B1 11/2003 Penteroudakis et al.
7,136,876 B1 11/2006 Adar et al.
(Continued)

FOREIGN PATENT DOCUMENTS

GB 2336694 A 10/1999
RU 2010117390 A 11/2011

OTHER PUBLICATIONS https://www.abbyy.com/ru-ru/news/2004/10/abbyy-lingvo-10-akademiya-na-polke/#sthash.WsnYN2ia.yzT3YhPq.dpbs, retrieved on Mar. 16, 2017.

(Continued)

*Primary Examiner* — Matthew Baker
(74) *Attorney, Agent, or Firm* — BCF LLP

(57) ABSTRACT

There is provided a method of performing an on-line definition of a first word, the first word received from a user of an electronic device via a communication network. The method can be executed at a server. The method comprises: obtaining a first definition set from a first source, the first definition set being based on the first word; obtaining a second definition set from a second source, the second definition set being based on the first word; parsing the first definition set to obtain individual first set words; parsing the second definition set to obtain individual second set words; organizing the individual first set words into at least one definition cluster; causing the electronic device to display to the user at least the first cluster.

22 Claims, 5 Drawing Sheets

(52) U.S. Cl.
CPC .... *G06F 17/30705* (2013.01); *G06F 17/2795* (2013.01); *G06F 17/289* (2013.01)

(58) Field of Classification Search
USPC ........................................................ 704/10
See application file for complete search history.

(56) References Cited

U.S. PATENT DOCUMENTS

| | | | | |
|---|---|---|---|---|
| 8,332,206 | B1* | 12/2012 | Sadovsky | G06F 17/2735 |
| | | | | 704/10 |
| 9,342,233 | B1* | 5/2016 | Dimson | G06F 3/0488 |
| 2003/0221171 | A1* | 11/2003 | Rust | G06F 17/21 |
| | | | | 715/236 |
| 2004/0034525 | A1* | 2/2004 | Pentheroudakis | G06F 17/2705 |
| | | | | 704/9 |
| 2004/0254781 | A1 | 12/2004 | Appleby | |
| 2005/0033582 | A1* | 2/2005 | Gadd | G06Q 30/02 |
| | | | | 704/277 |
| 2005/0234709 | A1* | 10/2005 | Klavans | G06F 17/2735 |
| | | | | 704/10 |
| 2009/0019026 | A1 | 1/2009 | Valdes et al. | |
| 2010/0042617 | A1 | 2/2010 | Matveenko et al. | |
| 2010/0223133 | A1 | 9/2010 | Scott et al. | |
| 2011/0289115 | A1* | 11/2011 | Schiller | G06F 17/30663 |
| | | | | 707/770 |
| 2013/0159295 | A1 | 6/2013 | Gross | |

OTHER PUBLICATIONS

Translation of reference 1 using Google Translate: https://translate.google.com/translate?hl=en&sl=ru&tl=en &u=https%3A%2F%2Fwww.abbyy.com%2Fru-ru%2Fnews%2F2004%2F10%2Fabbyy-lingvo-10-akademiya-na-polke%2F%23sthash.WsnYN2ia.dpbs, retrieved on Mar. 16, 2017.
International Search Report from PCT/IB2014/065542, dated Mar. 4, 2015, Blain R. Copenheaver.
English abstract of RU2010117390 retrieved from Espacenet on Jun. 29, 2016.
Burge, Remove Duplicate Views Results, https://www.ostraining.com/blog/drupal/duplicate-views-results/, retrieved on Jun. 29, 2016.

* cited by examiner

METHOD AND SYSTEM FOR GENERATING A DEFINITION OF A WORD FROM MULTIPLE SOURCES

CROSS-REFERENCE

The present application claims priority to Russian Patent Application No. 2014116104, filed Apr. 21, 2014, entitled "A METHOD AND SYSTEM FOR GENERATING A DEFINITION OF A WORD FROM MULTIPLE SOURCES" the entirety of which is incorporated herein.

FIELD

The present technology relates to search engines in general and specifically to a method and system for generating a definition of a word from multiple sources

BACKGROUND

Various global or local communications networks (the Internet, the World Wide Web, local area networks and the like) offer a user a vast amount of information. The information includes a multitude of contextual topics, such as but not limited to, news and current affairs, maps, company information, financial information and resources, traffic information, games and entertainment related information. Users use a variety of client devices (desktop, laptop, notebook, smartphone, tablets and the like) to gain access to rich content (like images, audio, video, animation, and other multimedia content from such networks).

The Internet, as an example of the global information network, is truly becoming an international entity. In this day and age, many of the web resources available on the Internet provide information in multiple languages. For example, the Wikipedia web resource contains articles in numerous languages, including English, Japanese, Russian, Italian, Polish, Spanish, German, French, Portuguese, just to name a few.

Other web resources provide information in a single (or only a few languages). For example, Internet web page associated with TD Bank (Canada) provides information in English and French, the two official languages of Canada. The Internet web page of Raiffeisen Bank (Russia) provides information in Russian and in English. So, if a given user who speaks Mandarin, for example, but does not speak English, French or Russian (in this example) and which user wishes to browse the information of either of these resources, that user would need to find a way to translate the information provided therein into Mandarin.

There are several solutions available for on-line translation of words or texts from one language to another using various on-line tools. For example, most commercially available search engines provide on-line translation tools. For instance, Google™ search engine and Yandex™ search engine both have online translation tools for translating words and/or passages from one language to another. For example, Yandex.Translate service provides users an ability to translate in 26 languages, including predictive typing, spell-checking, dictionary and a number of additional features.

Some search engines also provide dictionary services. For example, Yandex.Dictionary service provides a user an ability to define a particular term (either in the same or in a different language). As a matter of general description, the dictionary service is configured to access several on-line sources (general dictionaries, specialized dictionaries, thesauruses and the like) and, in response, to user-definition-request to order the definition of the words contained in the user-definition-request from the several on-line sources. The dictionary service can then present the user results of such definition.

With reference to FIG. 1, there is depicted a screen shot 100, the screen shot 100 showing an example of a user interface 101 for providing the user the results of such definition. The user interface 101 is implemented in accordance with prior art techniques. For the sake of this illustration, it shall be assumed that the user is using the Yandex.Dictionary service and that the user is desirous of getting definition of the Russian word "резолюция". The screen shot 100 depicts a portion of the web browser used by the user to access the aforementioned Yandex.Dictionary service, for example, by accessing slovary.yandex.ru web site.

The user interface 101 comprises a service identifier 102, which in this case identified Yandex.Dictionary as the service (in Russian: "Яндех Словари"). The user interface 101 further comprises a service interface 104, the service interface 104 for enabling the user to input the user-definition-request. More specifically, the service interface 104 includes a command bar 106, where the user has entered the indication of the user-definition-request, which in this example includes Russian word "резолюция". The service interface 104 also includes user action buttons, such as: an all languages button 105 (for selecting the language of the definition, for example, Russian to English or, as depicted in FIG. 1, for all available languages, which is depicted in Russian to read: "резолюция"), a find button 107 (for starting the definition look up process, which is depicted in Russian to read: "Найти").

The service interface 104 further includes a definition service button 108 (in Russian: "персвод"), an encyclopedia service button 110 (in Russian: "энциклопедии") and a home language button 112 (in Russian: "русский язык"). The definition service button 108 is for enabling the user to indicate her desire to use the definition sub-service of the dictionary service. The encyclopedia service button 110 is for enabling the user to indicate her desire to use the definition sub-service of the dictionary service using one or more on-line encyclopedia resources. Finally, the home language button 112 is for enabling the user to indicate her desire to use the same language definition or thesaurus sub-service of the dictionary service.

The service interface 104 further includes a definition service link 114 (in Russian: "перевод текста"), which allows for the user to indicate her desire to use the aforementioned definition service to translate the user-definition-request entered into the command bar 106. The service interface 104 further includes a detail selection button 140 (in Russian: "подробно"), the detail selection button 140 for selectively choosing more or fewer details associated with the aggregate output of the definition service (to be described herein below).

To complete the general description of the service interface 104 further includes a vertical services links panel 116, which in this illustrated prior art example includes links to other services available from the same provider as the one providing the dictionary service. The illustrated example, the vertical services links panel 116 includes links to: a general search engine, a mail service, a map service, an on-line store service, a news service, a dictionary service (currently active), a blog service, a video service, an image service and a more services button (all not separately numbered and respectively depicted in Russian as: "Поиск", "Почта", "Карты", "Маркет", "Новости", "Словари", "Блоги", "Видео", "Картинки", "еще").

The service interface 104 further includes the definition service window 118 for providing, to the user, an output of the definition service in response to the user entering the user-definition-request into the command bar 106. The definition service window 118 includes a first definition portion 120, a second definition portion 122, a third definition portion 124, a fourth definition portion 126 and a fifth definition portion 128. Generally speaking, the content within the first definition portion 120, the second definition portion 122, the third definition portion 124, the fourth definition portion 126 and the fifth definition portion 128 are definitions of the word or phrase contained in the user-definition-request submitted via the command bar 106, the definitions being obtained from different respective sources.

As such, in the depicted example, the content of the first definition portion 120 is obtained from the "Russian-English General Dictionary. Lingvo Universal.". This can be deemed to be the principle source (determined by various algorithms). In the depicted example, the detail selection button 140 has been actuated in the "detailed" mode and, as such, the first definition portion 120 (being the principle source) contains an expanded list of definitions (namely two) with the associated examples of use. As such, it provides two definitions—"resolution" and "decision; instructions". It is also noted that for each of the variants of the definition, the first definition portion 120 provides respective examples of use: "to resolve"/"to append instructions on". It is noted that if the detail selection button 140 was actuated into the "abbreviated" mode, the first definition portion 120 would provide two definitions without the associated examples.

The remainder of the second definition portion 122, the third definition portion 124, the fourth definition portion 126 and the fifth definition portion 128 are definitions of the word or phrase contained in the user-definition-request submitted via the command bar 106 obtained from other (secondary) sources. To that end, the second definition portion 122 presents information obtained from "English-Russian Dictionary of Computer Science and Programming". The third definition portion 124 presents information obtained from "English-Russian Dictionary of Economics". The fourth definition portion 126 presents information obtained from "English-Russian Dictionary of Law" Finally, the fifth definition portion 128 presents information obtained from "English-Russian Dictionary of Scientific Terms".

It is noted that each of the second definition portion 122, the third definition portion 124, the fourth definition portion 126 and the fifth definition portion 128 provides a definition that includes "resolution", just like at least a portion of the first definition portion 122.

SUMMARY

It is an object of the present technology to ameliorate at least some of the inconveniences present in the prior art. Embodiments of the present technology have been developed based on inventors' appreciation of at least one shortcoming associated with the prior art.

More specifically, as has been illustrated with reference to FIG. 1, when the user submitted a request for definition using the user-definition-request submitted via the command bar 106, the dictionary service provided responses from several sources, some of them overlapping or even being the same. As has been showed in FIG. 1, the second definition portion 122, the third definition portion 124, the fourth definition portion 126 and the fifth definition portion 128 all provide a definition that includes the same meaning as the one provided in the principle source, i.e. the first definition portion 122.

Despite this repetition, all of the content of the response from the second definition portion 122, the third definition portion 124, the fourth definition portion 126 and the fifth definition portion 128 is displayed, separately, within the definition service window 118, taking up real estate of the user screen and "wasting" user's time for having to sieve through all of the results, only to realize that the results provided within the second definition portion 122, the third definition portion 124, the fourth definition portion 126 and the fifth definition portion 128 are repetitive with what has been shown within the first definition portion 120.

Therefore, according to a first broad aspect of the present technology, there is provided a method of performing an on-line definition of a first word, the first word received from a user of an electronic device via a communication network. The method is executed at a server. The method comprises: obtaining a first definition set from a first source, the first definition set being based on the first word; obtaining a second definition set from a second source, the second definition set being based on the first word; parsing the first definition set to obtain individual first set words; parsing the second definition set to obtain individual second set words; organizing the individual first set words into at least one definition cluster; responsive to at least one of the individual second set words matching any one of the individual first set words, associating at least a portion of the individual second set words with the first cluster; responsive to at least one of the individual second set words not matching any of the individual first set words, associating at least a portion of the individual second set words with a second cluster; causing the electronic device to display to the user at least the first cluster.

According to some implementations of the method, causing the electronic device to display to the user at least the first cluster comprises causing the electronic device to display to the user at least the first cluster and the second cluster.

According to some implementations of the method, at least the portion of the individual second set words has been associated with the first cluster, and causing the electronic device to display to the user at least the first cluster comprises further comprises causing the electronic device to display to the user, in association with the first cluster, an indication of the first source and the second source being sources for the content of the first cluster.

According to some implementations of the method, the indication of the first source and the second source comprises a count of how many sources are associated with the first cluster.

According to some implementations of the method, the indication of the first source and the second source comprises a link to the first source and the second source.

According to some implementations of the method, the first definition set includes a definition portion and at least one auxiliary portion.

According to some implementations of the method, at least one auxiliary portion contains at least one of: an example, a synonym, an antonym, a link, a source identifier associated with the definition portion.

According to some implementations of the method, parsing the first definition to obtain individual words comprises extracting the individual words from the definition portion.

According to some implementations of the method, parsing further comprises extracting the at least one of: an example, a synonym, an antonym, a link, a source identifier and the method further comprises organizing the at least one of: an example, a synonym, an antonym, a link, a source identifier with the first cluster.

According to some implementations of the method, obtaining a first definition set from a first source comprises receiving a server message from the first source encoded in a first communication protocol, the server message containing the first definition.

According to some implementations of the method, the method further comprises transcoding the server message from the first communication protocol into another format.

According to some implementations of the method, the second definition set includes a definition portion and at least one auxiliary portion.

According to some implementations of the method, at least one auxiliary portion contains at least one of: an example, a synonym, an antonym, a link, a source identifier associated with the definition portion.

According to some implementations of the method, parsing the second definition to obtain individual words comprises extracting the individual words from the definition portion.

According to some implementations of the method, parsing further comprises extracting the at least one of: an example, a synonym, an antonym, a link, a source identifier and the method further comprises organizing the at least one of: an example, a synonym, an antonym, a link, a source identifier with either one of the first cluster and the second cluster.

According to some implementations of the method, obtaining a second definition set from a second source comprises receiving a server message from the second source encoded in a first communication protocol, the server message containing the first definition.

According to some implementations of the method, the method further comprises transcoding the server message from the first communication protocol into another format.

According to some implementations of the method, organizing the individual first set words into at least one definition cluster comprises organizing the individual first set words into at least one definition cluster based on associated headings provided within the first definition set.

According to some implementations of the method, organizing the individual first set words into at least one definition cluster is executed responsive to a determination that the first definition set is a primary set.

According to some implementations of the method, the method further comprises determining if the first definition set is the primary set.

According to some implementations of the method, the method further comprises checking if at least one of the individual second set words matches any one of the individual first set words.

According to some implementations of the method, checking comprises checking if all of the individual second set words matches all of the individual first set words.

According to some implementations of the method, checking further comprises organizing words within the individual second set words and the individual first set words into respective alphabetical orders.

According to some implementations of the method, checking further comprises organizing words within the individual second set words and the individual first set words according to a normalization parameter.

According to some implementations of the method, the method further comprises determining that the individual second set words matches the individual first set words if all of the words within that the individual second set words match all the words in the individual first set words, once the word have been organized.

According to some implementations of the method, the associating at least a portion of the individual second set words with a second cluster comprises creating the second cluster using the portion of the individual second set.

According to some implementations of the method, the method further comprising checking the individual first set words and the individual second set words for forbidden words.

According to some implementations of the method, the method further comprising removing any forbidden words from the respective ones of the individual first set words and the individual second set words.

In another broad aspect of the present technology, there is provided a server. The server comprises: a communication interface for communication with an electronic device via a communication network; a processor operationally connected with the communication interface, the processor configured to: receive, from the electronic device via the communication network, an indication of a first word; obtain a first definition set from a first source, the first definition set being based on the first word; obtain a second definition set from a second source, the second definition set being based on the first word; parse the first definition set to obtain individual first set words; parse the second definition set to obtain individual second set words; organize the individual first set words into at least one definition cluster; responsive to at least one of the individual second set words matching any one of the individual first set words, associate at least a portion of the individual second set words with the first cluster; responsive to at least one of the individual second set words not matching any of the individual first set words, associate at least a portion of the individual second set words with a second cluster; cause, over the communication network, the electronic device to display to the user at least the first cluster.

In some implementations of the server, to cause the electronic device to display to the user at least the first cluster, the processor is configured to cause the electronic device to display to the user at least the first cluster and the second cluster.

In some implementations of the server, at least the portion of the individual second set words has been associated with the first cluster, and wherein to cause the electronic device to display to the user at least the first cluster, the processor is configured to further cause the electronic device to display to the user, in association with the first cluster, an indication of the first source and the second source being sources for the content of the first cluster.

In some implementations of the server, indication of the first source and the second source comprises a count of how many sources are associated with the first cluster.

In some implementations of the server, indication of the first source and the second source comprises a link to the first source and the second source.

In some implementations of the server, the first definition set includes a definition portion and at least one auxiliary portion.

In some implementations of the server, the at least one auxiliary portion contains at least one of: an example, a synonym, an antonym, a link, a source identifier associated with the definition portion.

In some implementations of the server, to parse the first definition to obtain individual words, the processor is configured to extract the individual words from the definition portion.

In some implementations of the server, the processor is further configured to extract the at least one of: an example, a synonym, an antonym, a link, a source identifier; and wherein the processor is further configured to organize the at least one of: an example, a synonym, an antonym, a link, a source identifier with the first cluster.

In some implementations of the server, to obtain a first definition set from a first source, the processor is configured to receive a server message from the first source encoded in a first communication protocol, the server message containing the first definition.

In some implementations of the server, the processor being further operable to transcode the server message from the first communication protocol into another format.

In some implementations of the server, the second definition set includes a definition portion and at least one auxiliary portion.

In some implementations of the server, at least one auxiliary portion contains at least one of: an example, a synonym, an antonym, a link, a source identifier associated with the definition portion.

In some implementations of the server, to parse the second definition to obtain individual words, the processor is configured to extract the individual words from the definition portion.

In some implementations of the server, the processor being further operable to extract the at least one of: an example, a synonym, an antonym, a link, a source identifier; and wherein the processor is further configured to organize the at least one of: an example, a synonym, an antonym, a link, a source identifier with either one of the first cluster and the second cluster.

In some implementations of the server, to obtain a second definition set from a second source, the processor is operable to receive a server message from the second source encoded in a first communication protocol, the server message containing the first definition.

In some implementations of the server, the processor being further operable to transcode the server message from the first communication protocol into another format.

In some implementations of the server, to organize the individual first set words into at least one definition cluster, the processor is operable to organize the individual first set words into at least one definition cluster based on associated headings provided within the first definition set.

In some implementations of the server, the processor is configured to organize the individual first set words into at least one definition cluster responsive to a determination that the first definition set is a primary set.

In some implementations of the server, the processor being further operable to determine if the first definition set is the primary set.

In some implementations of the server, the processor being further operable to check if at least one of the individual second set words matches any one of the individual first set words.

In some implementations of the server, to check, the processor is configured to check if all of the individual second set words match all of the individual first set words.

In some implementations of the server, to check, the processor is further configured to organize words within the individual second set words and the individual first set words into respective alphabetical orders.

In some implementations of the server, to check, the processor is further configured to organize words within the individual second set words and the individual first set words according to a normalization parameter.

In some implementations of the server, the processor being further operable to determine that the individual second set words matches the individual first set words if all of the words within that the individual second set words match all the words in the individual first set words, once the word have been organized.

In some implementations of the server, to associate at least a portion of the individual second set words with a second cluster, the processor is configured to create the second cluster using the portion of the individual second set.

In some implementations of the server, the processor being further configured to check the individual first set words and the individual second set words for forbidden words.

In some implementations of the server, the processor being further configured to remove any forbidden words from the respective ones of the individual first set words and the individual second set words.

According to another broad aspect of the present technology, there is provided a method of performing an on-line definition of a first word, the first word received from a user of an electronic device via a communication network. The method is executed at a server. The method comprises: obtaining a first definition word from a first source, the first definition words being based on the first word; obtaining a second definition word from a second source, the second definition words being based on the first word; analyzing the first definition word and the second definition word to determine if they are substantially the same; responsive to the first definition word and the second definition word being substantially the same, grouping them together into an aggregate output entry; causing the electronic device to display to the user an indication of the aggregate output entry combined with an indication of the first source and the second source.

In some implementations of the method, the indication of the first source and the second source comprises a count of how many sources are associated with the aggregate output entry.

In some implementations of the method, the indication of the first source and the second source comprises a link to the first source and the second source.

In the context of the present specification, a "definition" should be understood broadly to encompass definition of the word in the same language; translation of the word into a different language; definition of the word in another language, providing examples of use of the word in the same or a different language or any combination of these. Also, definition of a word does not necessarily mean a definition of a single word and may encompass definition of a phrase or a text.

In the context of the present specification, a "server" is a computer program that is running on appropriate hardware and is capable of receiving requests (e.g. from client devices) over a network, and carrying out those requests, or causing those requests to be carried out. The hardware may be one physical computer or one physical computer system, but neither is required to be the case with respect to the present technology. In the present context, the use of the expression a "server" is not intended to mean that every task (e.g. received instructions or requests) or any particular task will have been received, carried out, or caused to be carried out, by the same server (i.e. the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "client device" is any computer hardware that is capable of running software appropriate to the relevant task at hand Thus, some (non-limiting) examples of client devices include personal computers (desktops, laptops, netbooks, etc.), smartphones, and tablets, as well as network equipment such as routers, switches, and gateways. It should be noted that a device acting as a client device in the present context is not precluded from acting as a server to other client devices. The use of the expression "a client device" does not preclude multiple client devices being used in receiving/sending, carrying out or causing to be carried out any task or request, or the consequences of any task or request, or steps of any method described herein.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, etc.

In the context of the present specification, the expression "component" is meant to include software (appropriate to a particular hardware context) that is both necessary and sufficient to achieve the specific function(s) being referenced.

In the context of the present specification, the expression "computer usable information storage medium" is intended to include media of any nature and kind whatsoever, including RAM, ROM, disks (CD-ROMs, DVDs, floppy disks, hard drivers, etc.), USB keys, solid state-drives, tape drives, etc.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 2:
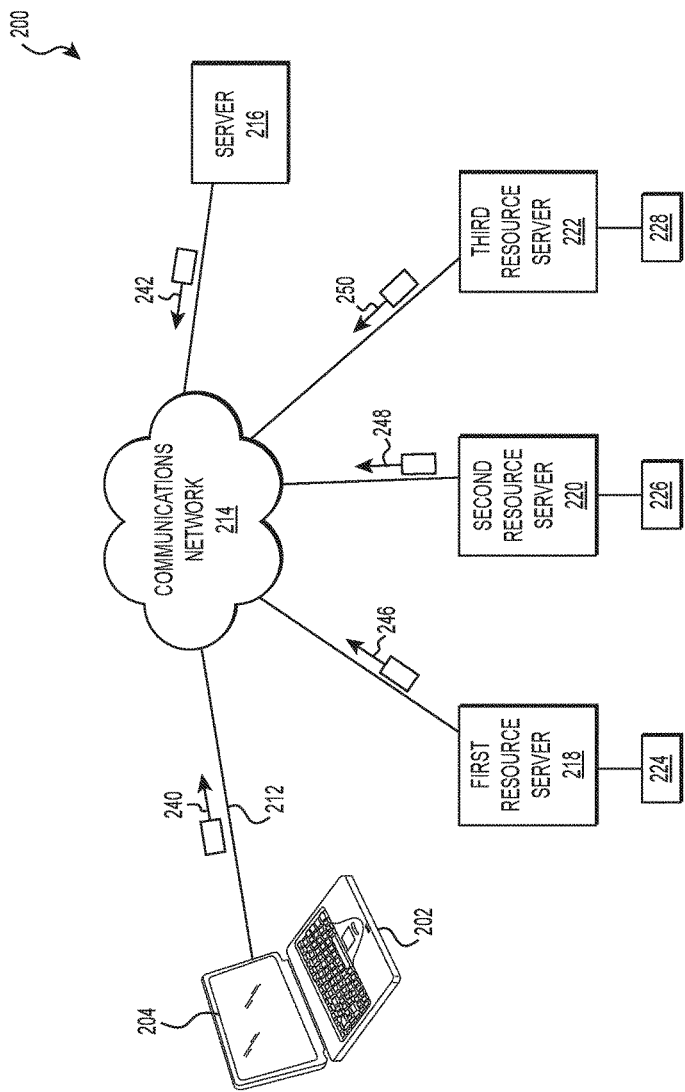
FIG. 2 is a schematic diagram depicting a system 200, the system 200 being implemented in accordance with non-limiting embodiments of the present technology.

Referring to FIG. 2, there is shown a schematic diagram of a system 200, the system 200 being suitable for implementing non-limiting embodiments of the present technology. It is to be expressly understood that the system 200 is depicted as merely as an illustrative implementation of the present technology. Thus, the description thereof that follows is intended to be only a description of illustrative examples of the present technology. This description is not intended to define the scope or set forth the bounds of the present technology. In some cases, what are believed to be helpful examples of modifications to the system 200 may also be set forth below. This is done merely as an aid to understanding, and, again, not to define the scope or set forth the bounds of the present technology. These modifications are not an exhaustive list, and, as a person skilled in the art would understand, other modifications are likely possible. Further, where this has not been done (i.e. where no examples of modifications have been set forth), it should not be interpreted that no modifications are possible and/or that what is described is the sole manner of implementing that element of the present technology. As a person skilled in the art would understand, this is likely not the case. In addition it is to be understood that the system 200 may provide in certain instances simple implementations of the present technology, and that where such is the case they have been presented in this manner as an aid to understanding. As persons skilled in the art would understand, various implementations of the present technology may be of a greater complexity.

The system 200 comprises an electronic device 202. The electronic device 202 is typically associated with a user (not depicted) and, as such, can sometimes be referred to as a "client device". It should be noted that the fact that the electronic device 202 is associated with the user does not need to suggest or imply any mode of operation—such as a need to log in, a need to be registered or the like.

The implementation of the electronic device 202 is not particularly limited, but as an example, the electronic device 202 may be implemented as a personal computer (desktops, laptops, netbooks, etc.), a wireless electronic device (a cell phone, a smartphone, a tablet and the like), as well as network equipment (a router, a switch, or a gateway). The general implementation of the electronic device 202 is known in the art and, as such, will not be described here at much length. Suffice it to say that the electronic device 202 comprises a user input interface (such as a keyboard, a mouse, a touch pad, a touch screen and the like) for receiving user inputs; a user output interface (such as a screen, a touch screen, a printer and the like) for providing visual or audible outputs to the user; a network communication interface (such as a modem, a network card and the like) for two-way communication over the communications network 214; and a processor coupled to the user input interface, the user output interface and the network communication interface, the processor being configured to execute various routines, including those described herein below. To that end the processor may store or have access to computer readable commands which commands, when executed, cause the processor to execute the various routines described herein.

The electronic device 202 comprises hardware and/or software and/or firmware (or a combination thereof), as is known in the art, to execute a browser application 204. Generally speaking, the purpose of the browser application 204 is to enable the user (not depicted) to access one or more web resources.

The electronic device 202 is coupled to a communications network 214 via a communication link 212. In some non-limiting embodiments of the present technology, the communications network 214 can be implemented as the Internet. In other embodiments of the present technology, the communications network 214 can be implemented differently, such as any wide-area communications network, local-area communications network, a private communications network and the like.

How the communication link 212 is implemented is not particularly limited and will depend on how the electronic device 202 is implemented. Recalling that the electronic device 202 is implemented, in this example, as a laptop, the communication link 212 can be either wireless (such as the Wireless Fidelity, or WiFi® for short, Bluetooth® or the like) or wired (such as an Ethernet based connection).

It should be expressly understood that implementations for the electronic device 202, the communication link 212 and the communications network 214 are provided for illustration purposes only. As such, those skilled in the art will easily appreciate other specific implementational details for the electronic device 202, the communication link 212 and the communications network 214. As such, by no means, examples provided herein above are meant to limit the scope of the present technology.

Also coupled to the communications network is a server 216. The server 216 can be implemented as a conventional computer server. In an example of an embodiment of the present technology, the server 216 can be implemented as a Dell™ PowerEdge™ Server running the Microsoft™ Windows Server™ operating system. Needless to say, the server 216 can be implemented in any other suitable hardware and/or software and/or firmware or a combination thereof. In the depicted non-limiting embodiment of present technology, the server 216 is a single server. In alternative non-limiting embodiments of the present technology, the functionality of the server 216 may be distributed and may be implemented via multiple servers.

The implementation of the server 216 is well known. However, briefly speaking, the server 216 comprises a communication interface (not depicted) structured and configured to communicate with various entities (such as the electronic device 202, for example and other devices potentially coupled to the communications network 214) via the communications network 214. The server 216 further comprises at least one computer processor (not depicted) operationally connected with the communication interface and structured and configured to execute various processes to be described herein.

In some embodiments, the server 216 can be operated by a search engine, such as the Yandex search engine, for example. In alternative embodiment, the server 216 can be operated by third party entity different from search engine entity.

There is also provided a first resource server 218 coupled to the communications network 214. Akin to the server 216, the first resource server 218 can be implemented as a conventional computer server. In an example of an embodiment of the present technology, the first resource server 218 can be implemented as a Dell™ PowerEdge™ Server running the Microsoft™ Windows Server™ operating system. Needless to say, the first resource server 218 can be implemented in any other suitable hardware and/or software and/or firmware or a combination thereof. In the depicted non-limiting embodiment of present technology, the first resource server 218 is a single server. In alternative non-limiting embodiments of the present technology, the functionality of the first resource server 218 may be distributed and may be implemented via multiple servers.

The first resource server 218 can host a first definition source 224. The first definition source 224 can be a first source of definitions or definitions or examples of use from one language to another (or in the same language). For the sake of example, let's assume that the first definition source 224 is Lingvo Universal dictionary.

There is also provided a second resource server 220 coupled to the communications network 214. Akin to the first resource server 218, the second resource server 220 can be implemented as a conventional computer server. In an example of an embodiment of the present technology, the second resource server 220 can be implemented as a Dell™ PowerEdge™ Server running the Microsoft™ Windows Server™ operating system. Needless to say, the second resource server 220 can be implemented in any other suitable hardware and/or software and/or firmware or a combination thereof. In the depicted non-limiting embodiment of present technology, the second resource server 220 is a single server. In alternative non-limiting embodiments of the present technology, the functionality of the first resource server 218 may be distributed and may be implemented via multiple servers.

The second resource server 220 can host a second definition source 226. The second definition source 226 can be a second source of definitions or definitions or examples of use from one language to another (or in the same language). For the sake of example, let's assume that the second definition source 226 is Lingo Specialized dictionary.

Finally, there is also provided a third resource server 222 coupled to the communications network 214. Akin to the first resource server 218 and the second resource server 220, the third resource server 222 can be implemented as a conventional computer server. In an example of an embodiment of the present technology, the third resource server 222 can be implemented as a Dell™ PowerEdge™ Server running the Microsoft™ Windows Server™ operating system. Needless to say, the third resource server 222 can be implemented in any other suitable hardware and/or software and/or firmware or a combination thereof. In the depicted non-limiting embodiment of present technology, the third resource server 222 is a single server. In alternative non-limiting embodiments of the present technology, the functionality of the first resource server 218 may be distributed and may be implemented via multiple servers.

The third resource server 222 can host a third definition source 228. The third definition source 228 can be a third source of definitions or definitions or examples of use from one language to another (or in the same language). For the sake of example, let's assume that the third definition source 228 is Muller's Specialized dictionary.

Naturally, the first resource server 218, the second resource server 220 and the third resource server 220 can be implemented as single server. Furthermore, functionality of some or all of the first resource server 218, the second resource server 220 and the third resource server 220 can be implemented at the server 216 (for example, as a dictionary cluster providing one or more dictionary vertical services and the like).

For the sake of illustrating embodiments of the present technology, we will use the same example as was used for illustrating the prior art approaches. Namely, it shall be assumed that the user is desirous of using Yandex.Dictionary service (the Yandex.Dictionary service being implemented in accordance with embodiments of the present technology) and that the user is desirous of getting definition of the Russian word "резолюция" using the Yandex.Dictionary service.

The server 216 can be in communication, via the communications network 214, with the first resource server 218, the second resource server 220 and the third resource server 222 using one or more of appropriate communications protocols. In some embodiments of the present technology, the server 216 can be in communication with the first resource server 218, the second resource server 220 and the third resource server 222 using JavaScript Object Notation (JSON) protocol. In other embodiments of the present technology, the server 216 can be in communication with the first resource server 218, the second resource server 220 and the third resource server 222 using Extendable Markup Language (XML) protocol. Naturally, other protocols can be used as well.

It is noted that in some embodiments, the server 216 can be in communication with some of the first resource server 218, the second resource server 220 and the third resource server 222 using a first protocol, while with others of the first resource server 218, the second resource server 220 and the third resource server 222 using a second protocol.

Figure 3:
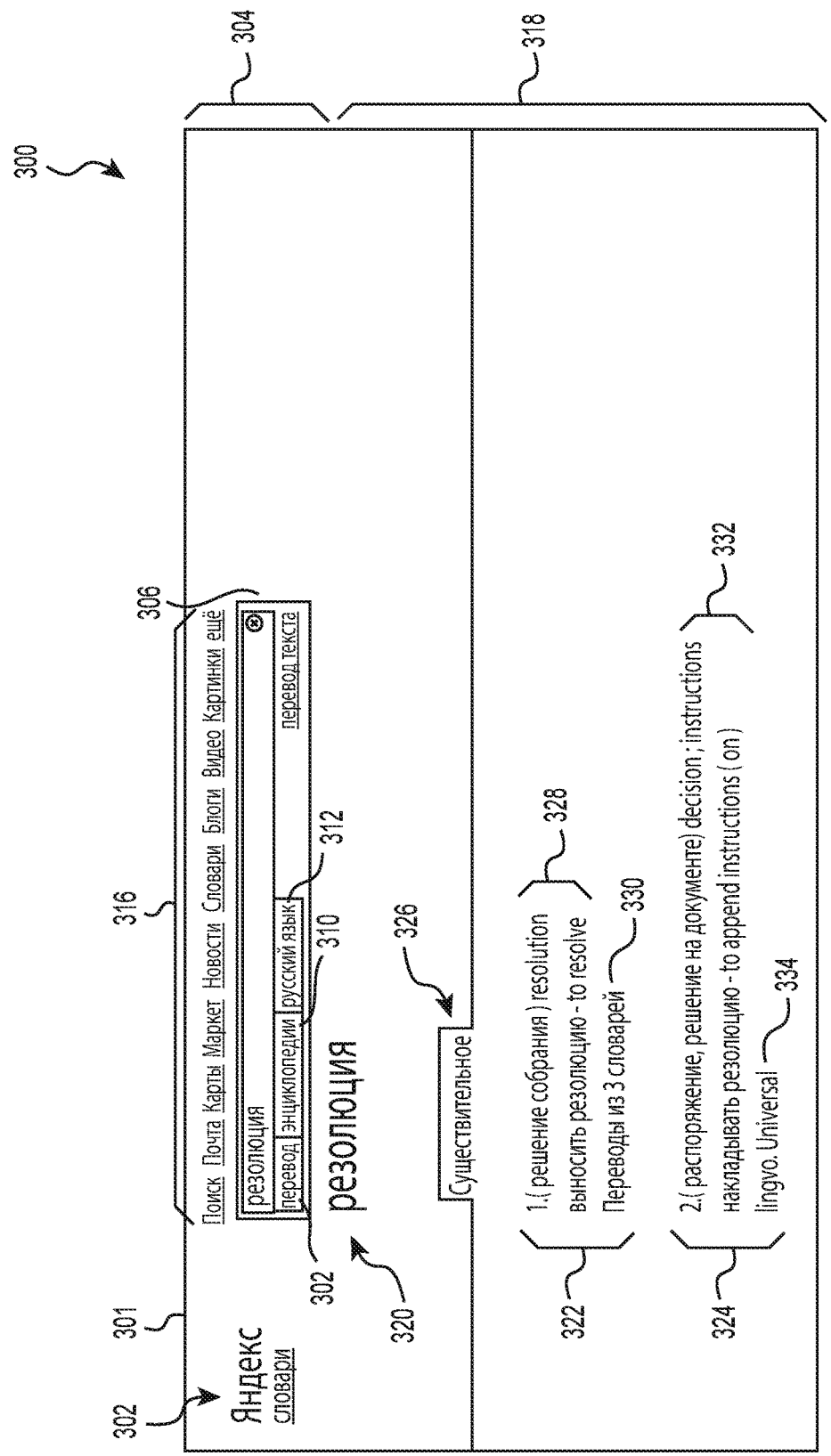
FIG. 3 is a schematic diagram of a screen shot 300, the screen shot 300 showing an example of a user interface 301 for providing the user the dictionary service implemented in accordance with embodiments of the present technology.

With reference to FIG. 3, there is depicted a screen shot 300, the screen shot 300 showing an example of a user interface 301 for providing the user the dictionary service implemented in accordance with embodiments of the present technology. The screen shot 300 depicts a portion of the web browser used by the user to access the Yandex.Dictionary service as implemented in accordance with the present technology, for example, by accessing slovary.yandex.ru web site.

Generally speaking, the purpose of the user interface 301 is to: (i) enable the user to submit the user-definition-request and (ii) responsive thereto, to receive definition of the word or phrase contained within the user-definition-request.

Figure 1:
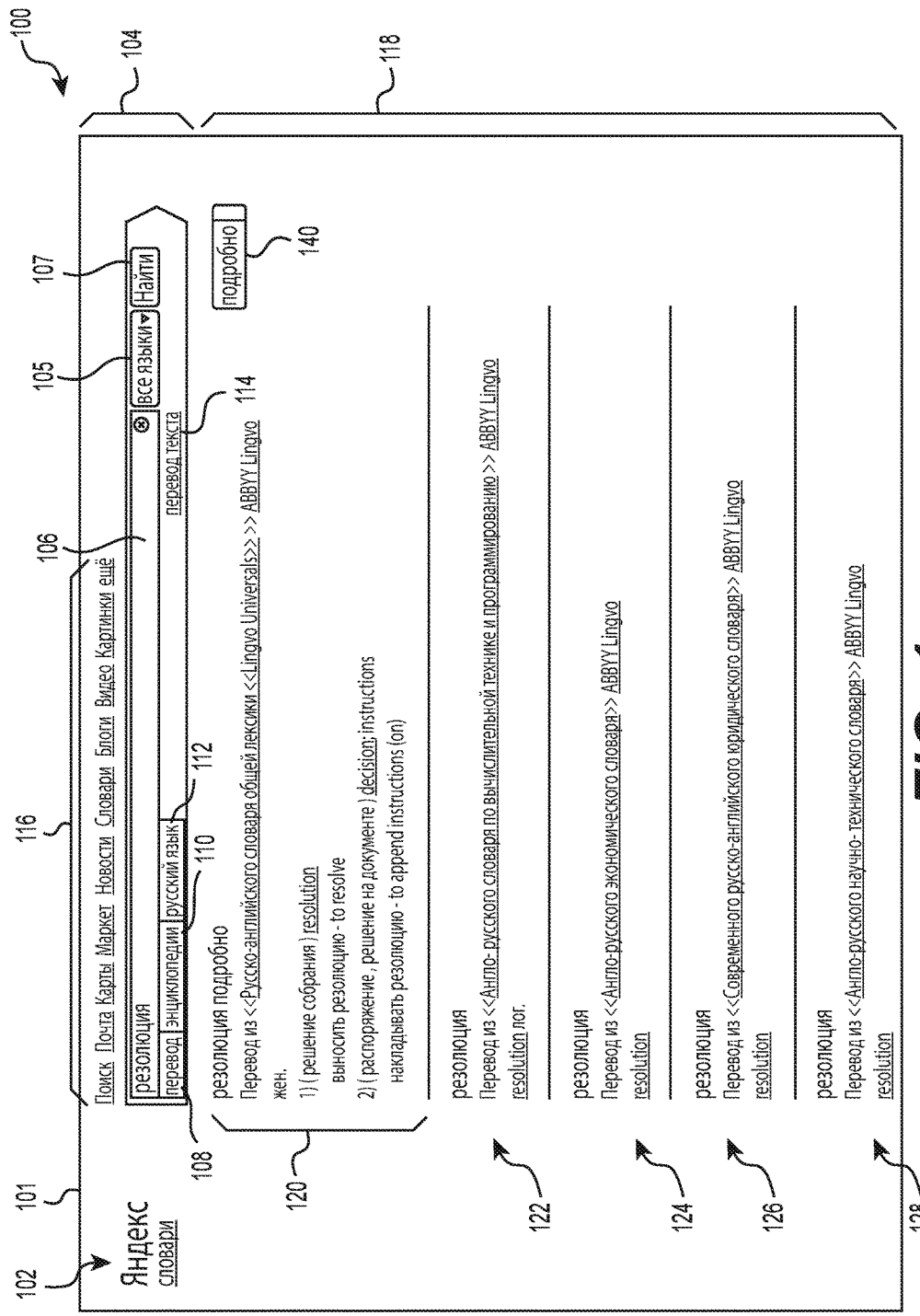
FIG. 1 is a schematic representation of a screen shot 102 showing a user interface 101 for implementing an on-line dictionary service generally implemented according to the known state of the art.

The user interface 301 comprises a service identifier 302, which in this case identified Yandex.Dictionary as the service (in Russian: "Яндех.Словари"). The user interface 301 further comprises a service interface 304, the service interface 304 for enabling the user to input the user-definition-request. More specifically, the service interface 304 includes a command bar 306, where the user has entered the indication of the user-definition-request, which in this example includes Russian word "резолюция". The service interface 304 also includes user action buttons (which are not depicted in this illustration), such as: an all languages button (for selecting the language of the definition, akin to the all languages button 105 of FIG. 1), a find button (for starting the definition look up process, akin to the find button 107 of FIG. 1).

The service interface 304 further includes a definition service button 308 (in Russian: "перевод"), an encyclopedia service button 310 (in Russian: "энциклопедии") and a home language button 312 (in Russian: "русский язык"). The definition service button 308 is for enabling the user to indicate her desire to use the definition sub-service of the dictionary service. The encyclopedia service button 310 is for enabling the user to indicate her desire to use the definition sub-service of the dictionary service using one or more on-line encyclopedia resources. Finally, the home language button 312 is for enabling the user to indicate her desire to use the same language definition or thesaurus sub-service of the dictionary service.

The service interface 304 further includes a definition service link 314 (in Russian: "перевод текста"), which allows for the user to indicate her desire to use the aforementioned definition service to translate the user-definition-request entered into the command bar 306. The service interface 304 may further include a detail selection button (in Russian: "подробно"), akin to the detail selection button 140 of FIG. 1, the detail selection button for selectively choosing more or fewer details associated with the output of the definition service (not depicted in FIG. 3).

To complete the general description of the service interface 304 further includes a vertical services links panel 316, which in this illustrated prior art example includes links to other services available from the same provider as the one providing the dictionary service. The illustrated example, the vertical services links panel 316 includes links to: a general search engine, a mail service, a map service, an on-line store service, a news service, a dictionary service (currently active), a blog service, a video service, an image service and a more services button (all not separately numbered and respectively depicted in Russian as: "Поиск", "Почта", "Карты", "Маркет", "Новости", "Словари", "Блоги", "Видео", "Картинки", "еще").

The service interface 304 further includes the definition service window 318 for providing, to the user, an output of the definition service in response to the user entering the user-definition-request into the command bar 306.

The definition service window 318 includes an indication of the original word 320, a first definition portion 322 and a second definition portion 324. Generally speaking, the content of the indication of the original word 320 contains an indication of the word/phrase being defined or translated, which in this examples depicts, in Russian: "резолюция". The content within the first definition portion 322 and the second definition portion 324 contain definitions of the word or phrase contained in the user-definition-request submitted via the command bar 306, the definitions being obtained from different respective sources as will be described momentarily.

According to embodiments of the present technology, the first definition portion 322 contains a first definition 328 and the associated list of sources 330. Within the depicted example, the first definition 328 includes a first definition ("resolution") and an example associated therewith ("to resolve"). The associated list of sources 330 includes an indication of the definition from 3 sources (in Russian: "Переводы из 3 словарей"). As will be described in further detail herein below, the first definition 328 includes an aggregated definition from more than one source and the indication of the number and/or identity of the more than one source is displayed to the user using the associated list of sources 330. In some embodiments, the list of sources 330 can be representative of a count of sources that provided the definition provided within the first definition 328. In some embodiments, the list of sources 330 can be a hyperlink, and if the user clicks or overs over the hyperlink, the list of the actual sources within the list of sources 330 will be displayed.

By the same token, the second definition portion 324 contains a second definition 332 and the associated list of sources 334. Within the depicted example, the second definition 332 includes a second definition ("decision; instructions") and an example associated therewith ("to append instructions (on)"). The associated list of sources 334 includes an indication of the source for the second definition (namely, Lingvo.Universal).

Now, the process for generating the first definition 322 and the second definition 324 will be explained in greater detail.

With reference to FIGS. 2 and 3, the user types in her user-definition-request into the command bar 306. The electronic device 202 transmits to the server 216, a user request 240. The server 216 receives the user request 240 and transmits a server request 242 to the first resource server 218, the second resource server 220 and the third resource server 222 using appropriate protocols. The first resource server 218, the second resource server 220 and the third resource server 222 receive the server request 242, query their respective first definition source 224, second definition source 226 and the third definition source 228 to obtain respective definition and transmit, respectively, a first service response 246, a second service response 248 and a third service response 250 (containing respective definitions/definitions, examples, and the like).

The server 216 receives the first service response 246, the second service response 248 and the third service response 250 via the communications network 214 and analyzes content thereof.

It will be recalled that in some embodiments, the first service response 246, the second service response 248 and the third service response 250 can be transmitted using different protocols (such as JSON, XML, and the like). In other embodiments, the information contained within the first service response 246, the second service response 248 and the third service response 250 can be formatted differently (for example, different definitions can be separated by paragraph marks, commas, semi-columns and the like).

Furthermore, some of the first service response 246, the second service response 248 and the third service response 250 can have definition only, while others of the first service response 246, the second service response 248 and the third service response 250 can have definition, as well as examples, synonyms, antonyms, transcriptions and the like. Within the various embodiments, the definition can be considered to be a first portions of the respective answer from the first service response 246, the second service response 248 and the third service response 250; while the remainder of the answer from the first service response 246, the second service response 248 and the third service response 250 can be considered to be an auxiliary portion. As such, the auxiliary portion can contain some or all of the examples, synonyms, antonyms, transcriptions and the like.

Therefore, in some embodiments the server 216 is configured to extract responses from the first service response 246, the second service response 248 and the third service response 250 and translate them into a single standard. In some embodiments, the server 216 can be configured to execute two routines: ParserService and DefinitionArticleParser routines.

ParserService corresponds to each of the first definition source 224, second definition source 226 and the third definition source 228 (such as LingvoParserService for the first definition source 224, etc). The ParserService routine of the server 216 is configured to receive the first service response 246, the second service response 248 and the third service response 250 and to render them into the unified format that can be fed into the DefinitionArticleParser. The rendering process can include (i) reconciling various communication protocols and/or (ii) retrieve rules for organizing the various fields of the respective ones of the first service response 246, the second service response 248 and the third service response 250 (such as definition demarcation rules, example demarcation rules, etc).

More specifically, the ParserService routine is configured to receive one of the answers from the first service response 246, the second service response 248 and the third service response 250 and to convert it into respective unified converted response in a unified format. In some embodiments, the server 216 can execute more than one ParserService routine, each one being for a dedicated one or a dedicated group of formats of the original formats of the first service response 246, the second service response 248 and the third service response 250.

As such, the server 216 (or more specifically, the ParserService routine executed at the server 216) transforms the first service response 246, the second service response 248 and the third service response 250 into respective the first unified service response 246, the second unified service response 248 and the third unified service response 250.

In some embodiments, the DefinitionArticleParser routine then organizes each of the answers from the first unified service response 246, the second unified service response 248 and the third unified service response 250 into an organized format of fields contained therein, the organized format of fields having some or all of: a definition field, a list of associated examples, synonyms, antonyms, transcription, associated URL, source identifier, source word language, destination word language and other potential attributes. Each of these fields may be assigned a tag, such as for example: <DEFINITION>, <EXAMPLE>, <SYNONYM>, <ANTONYM>, <SOURCE_IDENTIFIER> and the like.

In some embodiments of the present technology, the server 216 is configured to execute one or more additional manipulations with the first unified service response 246, the second unified service response 248 and the third unified service response 250.

In some embodiments, the server 216 can check the first unified service response 246, the second unified service response 248 and the third unified service response 250 to determine if they include any banned content. The term banned content should be interpreted broadly to include: typos, misspelled words, unclear definitions and the like. The banned content and be pre-set (and amended from time to time) by an operator of the server 216.

In some embodiments, the server 216 can analyze first unified service response 246, the second unified service response 248 and the third unified service response 250 to extract some or all of the associated examples, synonyms, antonyms, transcription and store them in separate database, for example, which can be convenient for executing a dedicated search using examples, synonyms, antonyms, transcription.

In some embodiments, the server 216 can further execute a routine to determine if the so-extracted examples, synonyms, antonyms, transcription are suitable for showing to the user. The server 216 can execute several heuristics to make such a determination. As an example, the examples provides within one of the first unified service response 246, the second unified service response 248 and the third unified service response 250 may not be in the same language as the destination language requested by the user. Such examples being in the "wrong" language may not be suitable for displaying to the user.

Other heuristic can determine if the analyzed examples actually provide a meaningful message to the user (for example, some examples potentially contained within the first unified service response 246, the second unified service response 248 and the third unified service response 250 may contain comments but no actual examples and, as such, be meaningless to the user). Generally speaking, this routine ensures that only user-useful content is extracted from the first unified service response 246, the second unified service response 248 and the third unified service response 250 and non-user-useful content is ignored.

In some embodiments, the server 216 can analyze the first unified service response 246, the second unified service response 248 and the third unified service response 250 to split the definition portion of them into discrete components (also sometimes referred to by those skilled in the art as "lines"). This is particularly convenient (but is not limited, nor necessary) for those scenarios, where the original first service response 246, the unified service response 248 and the unified service response 250 do not provide inherent organization of the definition into lines (but rather provide them as a single statement). In some embodiments, the server 216 can execute various heuristics to determine if the given one of the first unified service response 246, the second unified service response 248 and the third unified service response 250 need to be analyzed under this routine.

Same routine (albeit using different heuristics) can be applied to the analysis of the first unified service response 246, the second unified service response 248 and the third unified service response 250 to split the associated examples provided within the first unified service response 246, the second unified service response 248 and the third unified service response 250 to split into lines of examples, each line of examples to be associated with the respective line of definition.

In some embodiments, the server 216 can further analyze the first unified service response 246, the second unified service response 248 and the third unified service response 250 to remove invalid links provided therein. As is known, the first unified service response 246, the second unified service response 248 and the third unified service response 250 can contain links to other portions of the same source or to an external resources. Depending on the preferences pre-set by the operator of the server 216 some of these links may not be acceptable and should be removed.

Next, according to embodiments of the present technology, the server 216 is configured to execute a clustering routine of the first unified service response 246, the second unified service response 248 and the third unified service response 250.

Generally speaking, the clustering routine is configured to merge the answers from the first unified service response 246, the second unified service response 248 and the third unified service response 250 into an aggregate output to be displayed to the user, while properly managing repetitive answers from one or more of the first unified service response 246, the second unified service response 248 and the third unified service response 250. More specifically, this clustering routine is configured to: (i) group similar definitions/definitions into a single entry; (ii) re-distribute one or more examples to the relevant single entry of the definition; (iii) generate a list of several such-grouped single entries into an output to be displayed to the user.

First, the clustering routine can separate the definition and the associated examples data, as the clustering algorithms applied for the two can differ therebetween.

In some embodiments of the present technology, the server 216 determines which one of the first unified service response 246, the second unified service response 248 and the third unified service response 250 should be considered as a principle source. In some embodiments, this is executed by the operator of the server 216 selecting a principle one of the respective first definition source 224, second definition source 226 and the third definition source 228 for each pair of languages, for example. Alternatively, the server 216 can select a principle one of the respective first definition source 224, second definition source 226 and the third definition source 228 for each pair of languages, for example, using various machine learning algorithms.

The other ones of the first unified service response 246, the second unified service response 248 and the third unified service response 250 are deemed to be secondary sources.

For the purposes of this examples, it shall be assumed that the first unified service response 246 is the principle source and the second unified service response 248/the third unified service response 250 are the secondary sources.

First, the content of each of the first unified service response 246, the second unified service response 248 and the third unified service response 250 is split into "lines". A line is a grouping of one or more similar meanings (i.e. one or more definition words) within the given one of the first unified service response 246, the second unified service response 248 and the third unified service response 250. The lines can be detected using various algorithms, depending on the structure of the given one of the first unified service response 246, the second unified service response 248 and the third unified service response 250. For example, splitting into the lines can be based on a special symbol (such as "‖"), a punctuation mark (comma, semi-column), a paragraph mark, etc (as has been defined by the ParserService routine).

Then each of the lines within the given one of the first unified service response 246, the second unified service response 248 and the third unified service response 250 is organized into groups (such as by using their headings for example—headings can be "noun", "verb", etc or, alternatively, it can be different subsets of a meaning/definition of a given word or phrase).

Then, the actual merging routine starts. In some embodiments, the merging routine is implemented for each of the groups of the principle source with the groups within the secondary sources, executed on a group-by-group basis.

To that end, the server 216 starts with a given one group of the principle source (in this case, the first unified service response 246). The server 216 then compares a group from a secondary source (for example the second unified service response 248) with the given one group of the principle source. If there is a match determined, the server 216 merges them into a single unified record.

Determining a match can take many forms. In some embodiments of the present technology. In some embodiments, a given group from the secondary source is determined to match the given one of the principle source if all elements of the groups, alphabetically organized match. In other embodiments, the given group from the secondary source is determined to match the given one of the principle source if all elements of the groups, alphabetically organized and normalized based on a normalization parameter (such as register, diacritics and the like) match. In some embodiments, special symbols (such as brackets, for example) are removed when determining matches, in others, they are left in.

Alternatively, a given group from the secondary source is determined to match the given one of the principle source if at least one element of the groups, alphabetically organized match. In other embodiments, the given group from the secondary source is determined to match the given one of the principle source if at least one element of the groups, alphabetically organized and normalized based on a normalization parameter (such as register, diacritics and the like) match. In some embodiments, special symbols (such as brackets, for example) are removed when determining matches, in others, they are left in.

The following example will be used to illustrate the above clustering routine. Let's assume that the principle source (the first unified service response 246) contains the following group:

EXAMPLE 1 formality; technicality
ceremony, order

In the above example, the group is already organized into lines. Hence, no additional manipulation with the content of Example 1 is needed.

The secondary source (such as the second unified service response 248) contains the following group:

EXAMPLE 2 set order, ceremony, etiquette, custom; formality

In the above example, the group is not organized into lines. The server 216 can retrieve a rule associated with the grouping associated with the second unified service response 248 and determine that the lines within the group are separated by the semi-column. As such the server 216 can split the group into lines:

EXAMPLE 3 set order, ceremony, etiquette, custom
formality

Next, the server 216 compares each of the lines of Example 3 to Example 1 above. As such, the server 216 can determine that the second line of Example 3 matches the first line of the Example 1, while the first line of the Example 3 matches the second line of Example 1. The server 216 then merges the matched lines:

EXAMPLE 4 formality; technicality (Principle source)
   formality (Secondary source)
ceremony, order (Principle source)
   set order, ceremony, etiquette, custom (Secondary source)

Next, another secondary source (such as the third unified service response 250) contains the following group:

EXAMPLE 5 formality, etiquette, ceremony

Firstly, the server 216 retrieves grouping rules associated with the third unified service response 250. Let it be assumed that the line demarcation rule for the third unified service response 250 also involves a semi-column. In this case, the server 216 determines that Example 5 can not be split into lines.

The server 216 then compares the content of Example 5 with that of the Example 4.

In some embodiments of the present technology, at first stage of the process, the server 216 compares the content of Example 5 with only the principle portion of the content of Example 4. As can be seen, the content of Example 5 has content matching both elements of the principle portion of both a first cluster in Example 4 and a second cluster in Example 4. Hence, no clear determination can be made.

In some embodiments, the server 216 then puts the content of Example 5 aside until all other content that clearly matches Example 4 has been matched and merged. In other examples, the server 216 can compare the content of Example 5 with the secondary sources portion of the Example 4 right away. Alternatively, the server 216 can compare the content of Example 5 with the secondary sources portion of the Example 4 after all the other potential content of the Example 4 has been matched.

When the server 216 gets to match the content of Example 5 with the secondary sources data of the Example 4 (either as part of round 1 if executed right away, or as part of round N if executed after all the other clear matches have been executed), the server 216 determines that there is a single instance of a match with the secondary source within the first cluster of Example 4 and two instances of matches with the secondary source within the second cluster of Example 4. The server 216, hence matches the content of example 5 into the second cluster of Example 4:

EXAMPLE 6 formality; technicality (Principle source)
   formality (Secondary source)
ceremony, order (Principle source)
   set order, ceremony, etiquette, custom (Secondary source)
   formality, etiquette, ceremony (Secondary source)

In some scenarios, the server 216 may need to reconcile one or more of the ambiguities when clustering the definitions. For example, if a given line of a definition can be equally matched with one or more existing clusters, the server 216 can perform a frequency analysis of a portion of the existing cluster or a portion of the line to be merged with one or more existing clusters. In some embodiments, the server 216 then merges the line to be merged with the existing cluster with lower frequency.

For example, let illustrate the above routine by the following example—the server 316 needs to merge a line of definition for English word "clear": "ясный, недвусмысленный, определенный". Let it be assumed that the server 216 has four clusters: the definition "ясный" exists in three of the several clusters, while "недвусмысленный" exists only in one cluster of the several clusters. The server 216, may therefore merge the line to be merged with the cluster with the definition "недвусмысленный".

Alternatively, the server 216 may determine that the definition "ясный" is the more frequent one and merge the new line to be merged with one of the clusters that contains the definition "ясный".

It is noted that the frequency analysis can alternatively be done on the frequency of the given definition occurrence on the Internet, as a whole and not just within the already-organized clusters.

Alternatively or in case the above routines do not render a clear merging decision, the server 216 can merge the line to be merged with the first one of the already-organized clusters (the first referring to the order).

If any of the lines from the secondary sources do not match any of the lines from the primary source (or even the already-clustered secondary source lines), the server 216 can attempt to merge the unmatched secondary sources lines therebetween to define new clusters.

In alternative embodiments of the present technology, the server 216 can execute a more complex matching routine. For example, in some alternative embodiments of the present technology, the server 216 executes a first round of merging, as described above (i.e. merging the lines from the secondary sources with the primary source portions of the already-matched clusters and setting the unmatched lines from secondary sources aside).

The server 216 then attempts to merge the set-aside lines from secondary sources by comparing them with already-merged clusters (both primary and secondary portions). However, within these embodiments, rather than purely checking for a match, the server 216 calculates the number of instances of matches for each cluster: (a) if only one match within the already-matched clusters is found, the server 216 merges the set-aside line to be merged into the cluster; (b) if more than clusters match, the server 216 determines the number of matches within each of the already-matched clusters—the one with the highest number of matches is determined to be the matching one and the set-aside line to be matched is merged into that cluster; (c) if no matched are found, a new cluster is set using the set-aside line to be matched as the key.

Once the server 216 has matched all the lines of the definitions, the server 216 then organizes examples (and other yet-unmatched fields of the first unified service response 246, the second unified service response 248 and the third unified service response 250). In some scenarios, examples from some or all of the first unified service response 246, the second unified service response 248 and the third unified service response 250 may be inherently organized into example lines, each of the example lines matched to the corresponding native definition. In other scenarios, the server 216 has organized the examples from the respective ones of the first unified service response 246, the second unified service response 248 and the third unified service response 250 that were not inherently organized at the parsing stage.

Irrespective of how the examples were organized, at this stage, the server 216 merges the examples to the associated clusters of definitions that the server 216 has organized within Example 6 to create the final cluster of the definition:

EXAMPLE 7 formality; technicality (Principle source)
    formality (Secondary source)
    EXAMPLE A
    EXAMPLE B
ceremony, order (Principle source)
    set order, ceremony, etiquette, custom (Secondary source)
    formality, etiquette, ceremony (Secondary source)
    EXAMPLE C The final cluster of the definition presented in Example 7 is the aggregated definition that can be used to generate the first definition portion 322 (and, potentially, other definition portions that contain definitions from multiple sources).

Figure 4:
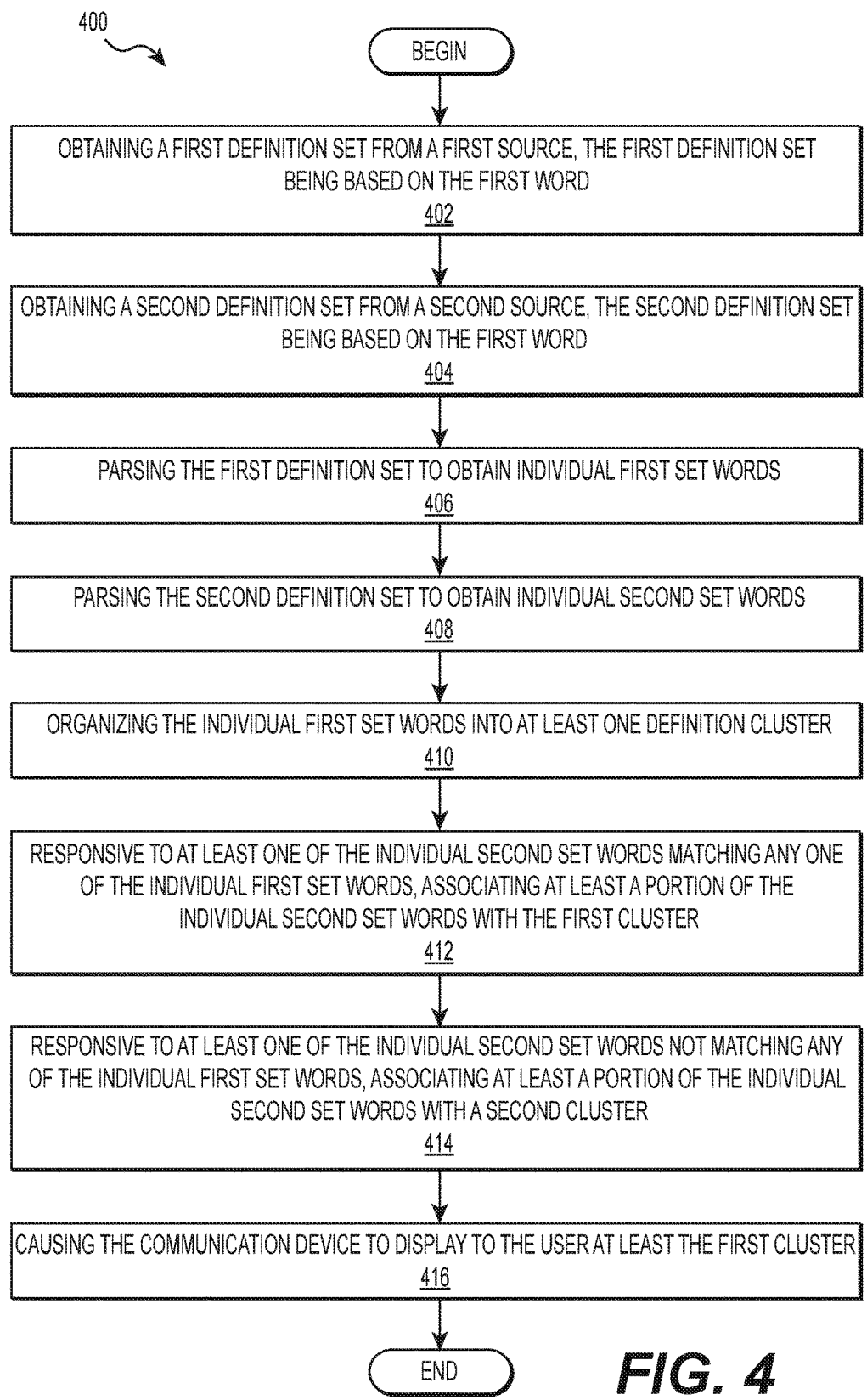
FIG. 4 depicts a flow chart of a method 400, the method 400 being executed at the server 216 of the system 200 of FIG. 2, the method 400 being implemented according to embodiments of the present technology.

Given the architecture of FIG. 2 and the examples provided above with reference to FIG. 3, a method of performing an on-line definition of a first word can be performed. With reference to FIG. 4, there is depicted a flow chart of a method 400, the method 400 being executed according to embodiments of the present technology. The method 400 can be conveniently executed at the server 216. To that end, the server 216 can have a non-transient computer readable medium that contains computer executable instructions, which instructions when executed cause the server 216 to execute the steps of the method 400.

For the method 400, it is assumed that the user has entered the user-definition-request using the service interface 304 and that the electronic device 202 has generated a user request 240 and that the server 216 has received the user request 240 (containing a first word to be defined or translated) from the electronic device 202.

Step 402—Obtaining a First Definition Set from a First Source, the First Definition Set being Based on the First Word The method 400 starts at step 402, where the server 216 obtains a first definition set from a first source, the first definition set being based on the first word. For the purposes of illustration, the server 216 obtains the above mentioned first service response 246 from the first resource server 218.

It will be recalled that the first server response 246 may be encoded in accordance with the communication protocol used by the first resource server 218. As such, in some embodiments step 402 may further comprises transcoding the first server response 246 from the first communication protocol (i.e. the communication protocol native to the first resource server 218) into another format (such as an internal protocol used for communication/analysis within the server 216).

In some embodiments of the present technology, the server 216 executes the above ParserService routine to execute a portion of step 402.

The method then proceeds to step 404.

Step 404—Obtaining a Second Definition Set from a Second Source, the Second Definition Set being Based on the First Word Next, at step 404, the server 216 obtains a second definition set from a second source, the second definition set being based on the first word. For the purposes of illustration, the server 216 obtains the above mentioned second service response 248 from the second resource server 220.

It will be recalled that the second server response 248 may be encoded in accordance with the communication protocol used by the second resource server 220. As such, in some embodiments step 404 may further comprises transcoding the second server response 248 from the first communication protocol (i.e. the communication protocol native to the second resource server 220) into another format (which can be the same format that was used for transcoding the first server response 246).

In some embodiments of the present technology, the server 216 executes the above ParserService routine to execute a portion of step 404.

The method then proceeds to step 406.

Step 406—Parsing the First Definition Set to Obtain Individual First Set Words Next, the server 216 parses the first definition set to obtain individual first set words. In some embodiments, the server 216 parses the information contained within the first server response 246. As has been described above, the server 216 can execute the DefinitionArticleParser routine to extract the definition from the first server response 246 and to break it down into individual definition words.

In some embodiments, the server 216 extracts from the first server response 246 the definition portion (i.e. the definition itself) and an auxiliary portion (i.e. some or all of an example, a synonym, an antonym, a link, a source identifier associated with the definition portion).

The method 400 then proceeds to step 408.

Step 408—Parsing the Second Definition Set to Obtain Individual Second Set Words Next, the server 216 parses the second definition set to obtain individual second set words. As has been described above, the server 216 can execute the DefinitionArticleParser routine to extract the definition from the first server response 246 and to break it down into individual definition words.

In some embodiments, the server 216 extracts from the second server response 248 the definition portion (i.e. the definition itself) and an auxiliary portion (i.e. some or all of an example, a synonym, an antonym, a link, a source identifier associated with the definition portion).

It should be noted that even though the steps 402, 404, 406 and 408 have been described in a particular sequence, no such specific sequence should be deemed to be a limitation of the present technology. As such, the order can be different, for example, steps 406-408 followed by steps 402-404.

The method then proceeds to step 410.

Step 410—Organizing the Individual First Set Words into at Least One Definition Cluster Next, at step 410, the server 216 organizes the individual first set words into at least one definition cluster.

In some embodiments, the step 410 is executed responsive to a determination that the first definition set is a primary set. In other words, the server 216 can first check if the first server response 246 should be deemed to be the primary source of the definition. If it is not the primary source, the step 410 is executed at whatever response is obtained from the primary source. Assuming that the first server response 246 is the primary source, the server 216 may organize the information contained within the first server response 246 into at least one definition cluster. This clustering can be executed based on heading or any other inherent definition logic built into the first server response 246. This clustering logic can be extracted by the ParserServer routine as part of step 402.

The method 400 then proceeds to step 412.

Step 412—Responsive to at Least One of the Individual Second Set Words Matching any One of the Individual First Set Words, Associating at Least a Portion of the Individual Second Set Words with the First Cluster Next, at step 412, responsive to at least one of the individual second set words matching any one of the individual first set words, the server 216 associates at least a portion of the individual second set words with the first cluster.

In some embodiments, the server 216 is configured to check if at least one of the individual second set words matches any one of the individual first set words. As has been described above, determining a match can take many forms. In some embodiments of the present technology. In some embodiments, a given group from the secondary source is determined to match the given one of the principle source if all elements of the groups, alphabetically organized match. In other embodiments, the given group from the secondary source is determined to match the given one of the principle source if all elements of the groups, alphabetically organized and normalized based on a normalization parameter (such as register, diacritics and the like) match. In some embodiments, special symbols (such as brackets, for example) are removed when determining matches, in others, they are left in.

Alternatively, a given group from the secondary source is determined to match the given one of the principle source if at least one element of the groups, alphabetically organized match. In other embodiments, the given group from the secondary source is determined to match the given one of the principle source if at least one element of the groups, alphabetically organized and normalized based on a normalization parameter (such as register, diacritics and the like) match. In some embodiments, special symbols (such as brackets, for example) are removed when determining matches, in others, they are left in.

As such, in a specific example embodiment, the checking executed as part of step 412 can comprise checking if all of the individual second set words matches all of the individual first set words (as organized and/or normalized) and determining that the individual second set words match the individual first set words if all of the words within that the individual second set words match all the words in the individual first set words, once the word have been organized/normalized.

If the matching renders a positive outcome, the server 216 merges at least a portion of the individual second set words into the first cluster (as has been illustrated above using various examples).

The method then proceeds to step 414.

Step 414—Responsive to at Least One of the Individual Second Set Words not Matching any of the Individual First Set Words, Associating at Least a Portion of the Individual Second Set Words with a Second Cluster Next, at step 414, responsive to at least one of the individual second set words not matching any of the individual first set words, the server 216 associates at least a portion of the individual second set words with a second cluster.

More specifically, if at least one of the individual second set words not matching any of the individual first set words, and since we only have one cluster, the server 216 associates at least a portion of the individual second set words with a second cluster.

Now, if we already had the two already-grouped clusters, the server 216 could repeat step 412 with all the already grouped clusters as has been described above using various examples before executing step 414 to create a brand new cluster.

The method then proceeds to step 416.

Step 416—Causing the Electronic Device to Display to the User at Least the First Cluster Next, at step 416, the server 216 causes the electronic device 202 to display to the user at least the first cluster. In some embodiments of the present technology, the server 216 causes the electronic device 202 to display to the user the first cluster and the second cluster. More specifically, the server 216 can cause the electronic device 202 to display the user interface 301 containing the first definition portion 322 and the second definition portion 324.

As has been described above, in some embodiments, as part of the first definition portion 322 and/or the second definition portion 324, an indication of the first source and the second source can be displayed, the first and second sources being the sources for the content of the first cluster (or the second cluster, as the case may be).

The indication of the first source and the second source can comprise a count of how many sources are associated with the first cluster. Additionally or alternatively, the indication of the first source and the second source comprises a link to the first source and the second source.

Given the architecture of FIG. 2 and the examples provided above with reference to FIG. 3, a method of performing an on-line definition of a first word executed in accordance with another non-limiting embodiment can be performed.

Figure 5:
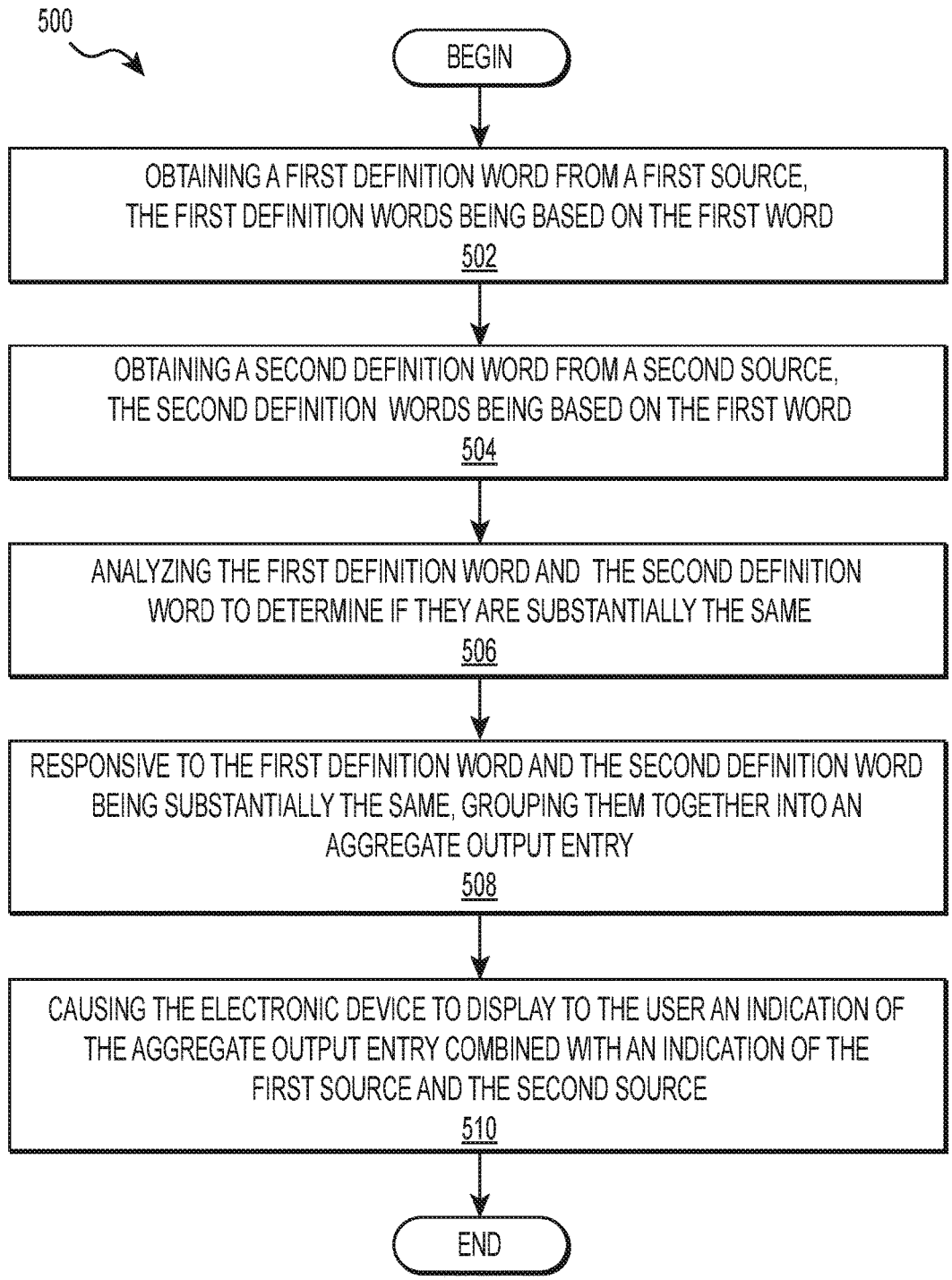
FIG. 5 depicts a flow chart of a method 500, the method 500 being executed at the server 216 of the system 200 of FIG. 2, the method 500 being implemented according to embodiments of the present technology.

With reference to FIG. 5, there is depicted a flow chart of a method 500, the method 500 being executed according to embodiments of the present technology. The method 500 can be conveniently executed at the server 216. To that end, the server 216 can have a non-transient computer readable medium that contains computer executable instructions, which instructions when executed cause the server 216 to execute the steps of the method 500.

For the method 500, it is assumed that the user has entered the user-definition-request using the service interface 304 and that the electronic device 202 has generated a user request 240 and that the server 216 has received the user request 240 from the electronic device 202.

Step 502—Obtaining a First Definition Word from a First Source, the First Definition Words being Based on the First Word The method 500 begins at step 502, where the server 216 obtains a first definition word from a first source, the first definition words being based on the first word. For the purposes of illustration, the server 216 obtains the above mentioned first service response 246 from the first resource server 218.

It will be recalled that the first server response 246 may be encoded in accordance with the communication protocol used by the first resource server 218. As such, in some embodiments step 402 may further comprises transcoding the first server response 246 from the first communication protocol (i.e. the communication protocol native to the first resource server 218) into another format (such as an internal protocol used for communication/analysis within the server 216).

In some embodiments of the present technology, the server 216 executes the above ParserService routine to execute a portion of step 502.

The method then proceeds to step 504.

Step 504—Obtaining a Second Definition Word from a Second Source, the Second Definition being Based on the First Word Next, at step 504, the server 216 obtains a second definition word from a second source, the second definition being based on the first word. For the purposes of illustration, the server 216 obtains the above mentioned first service response 246 from the first resource server 218.

It will be recalled that the first server response 246 may be encoded in accordance with the communication protocol used by the first resource server 218. As such, in some embodiments step 402 may further comprises transcoding the first server response 246 from the first communication protocol (i.e. the communication protocol native to the first resource server 218) into another format (such as an internal protocol used for communication/analysis within the server 216).

In some embodiments of the present technology, the server 216 executes the above ParserService routine to execute a portion of step 502.

The method then proceeds to step 506.

Step 506—Analyzing the First Definition Word and the Second Definition Word to Determine if they are Substantially the Same Next, at step 506, the server 216 analyzes the first definition word and the second definition word to determine if they are substantially the same. In other words, the server 216 can analyze if the first definition words matches (or substantially matches) the second definition word.

As has been described above, determining a match can take many forms. In some embodiments, a given group from the secondary source is determined to match the given one of the principle source if all elements of the groups, alphabetically organized match. In other embodiments, the given group from the secondary source is determined to match the given one of the principle source if all elements of the groups, alphabetically organized and normalized based on a normalization parameter (such as register, diacritics and the like) match. In some embodiments, special symbols (such as brackets, for example) are removed when determining matches, in others, they are left in.

Alternatively, a given group from the secondary source is determined to match the given one of the principle source if at least one element of the groups, alphabetically organized match. In other embodiments, the given group from the secondary source is determined to match the given one of the principle source if at least one element of the groups, alphabetically organized and normalized based on a normalization parameter (such as register, diacritics and the like) match. In some embodiments, special symbols (such as brackets, for example) are removed when determining matches, in others, they are left in.

The method then proceeds to step 508.

Step 508—Responsive to the First Definition Word and the Second Definition Word being Substantially the Same, Grouping them Together into an Aggregate Output Entry Next at step 508, the server 216, responsive to the first definition word and the second definition word being substantially the same, groups the first definition and the second definition together into an aggregate output entry.

More specifically, if the server 216 determines that the first definition word and the second definition word being substantially the same (i.e. finds a match or a substantial match), the server 216 groups the first definition and the second definition together into an aggregate output entry (such as a grouping described above with reference to Example 6 or Example 7).

The method 500 then proceeds to step 510

Step 510—Causing the Electronic Device to Display to the User an Indication of the Aggregate Output Entry Combined with an Indication of the First Source and the Second Source Next, at step 510, the server 216 causes the electronic device 202 to display to the user an indication of the aggregate output entry combined with an indication of the first source and the second source.

More specifically, the server 216 can cause the electronic device 202 to display the user interface 301 containing the first definition portion 322 and the second definition portion 324, the first definition portion 322 being an example of the indication of the aggregate output entry (i.e. the first definition 328) combined with an indication of the first source and the second source (i.e. the associated list of sources 330).

The indication of the first source and the second source (i.e. the associated list of sources 330) can comprise a count of how many sources are associated with the first cluster. Additionally or alternatively, the indication of the first source and the second source comprises a link to the first source and the second source.

It should be expressly understood that not all technical effects mentioned herein need to be enjoyed in each and every embodiment of the present technology. For example, embodiments of the present technology may be implemented without the user enjoying some of these technical effects, while other embodiments may be implemented with the user enjoying other technical effects or none at all.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A method of displaying an on-line definition of a first word on a screen of an electronic device, the first word being part of a user-definition-request received from a user of the electronic device by a server via a communication network, the server and the electronic device being communicatively coupled by the communication network, the method executed at the server, the method comprising:
    receiving, by the server, a first service response comprising a first definition set from a first source, the first definition set being based on the first word;
    receiving, by the server, a second service response comprising a second definition set from a second source, the second definition set being based on the first word;
    parsing, by the server, the first definition set to obtain individual first set words;
    parsing, by the server, the second definition set to obtain individual second set words;
    organizing, by the server, the individual first set words into at least one definition cluster;
    responsive to at least one of the individual second set words matching any one of the individual first set words, merging, by the server, at least a portion of the individual second set words with the first cluster, the first cluster comprising a merged definition set being distinct from the first and second definition sets;
    responsive to at least one of the individual second set words not matching any of the individual first set words, merging, by the server, at least a portion of the individual second set words with a second cluster, the second cluster being distinct from the first cluster;
    causing, by the server, the electronic device to display on the screen to the user both the first cluster and the second cluster as definitions of the first word, the first cluster and the second cluster being visually distinct when displayed on the screen.

2. The method of claim 1, wherein at least the portion of the individual second set words has been associated with the first cluster, and wherein causing the electronic device to display to the user at least the first cluster comprises further comprises causing the electronic device to display to the user, in association with the first cluster, an indication of the first source and the second source being sources for the content of the first cluster.

3. The method of claim 2, wherein the indication of the first source and the second source comprises a count of how many sources are associated with the first cluster.

4. The method of claim 2, wherein the indication of the first source and the second source comprises a link to the first source and the second source.

5. The method of claim 1, wherein the first definition set includes a definition portion and at least one auxiliary portion.

6. The method of claim 5, wherein the at least one auxiliary portion contains at least one of: an example, a synonym, an antonym, a link, a source identifier associated with the definition portion.

7. The method of claim 6, wherein the parsing the first definition to obtain individual words comprises extracting the individual words from the definition portion.

8. The method of claim 7, wherein the parsing further comprises extracting the at least one of: an example, a synonym, an antonym, a link, a source identifier and wherein the method further comprises organizing the at least one of: an example, a synonym, an antonym, a link, a source identifier with the first cluster.

9. The method of claim 1, wherein the second definition set includes a definition portion and at least one auxiliary portion.

10. The method of claim 9, wherein the at least one auxiliary portion contains at least one of: an example, a synonym, an antonym, a link, a source identifier associated with the definition portion.

11. The method of claim 10, wherein the parsing the second definition to obtain individual words comprises extracting the individual words from the definition portion.

12. The method of claim 1, wherein the organizing the individual first set words into at least one definition cluster comprises organizing the individual first set words into at least one definition cluster based on associated headings provided within the first definition set.

13. The method of claim 1, wherein the organizing the individual first set words into at least one definition cluster is executed responsive to a determination that the first definition set is a primary set.

14. The method of claim 13, further comprising determining if the first definition set is the primary set.

15. A server comprising:
    a communication interface for communication with an electronic device via a communication network;
    a processor operationally connected with the communication interface, the processor configured to:
        receive, from the electronic device via the communication network, an indication of a first word;

receive a first service response comprising a first definition set from a first source, the first definition set being based on the first word;

receive a second service response comprising a second definition set from a second source, the second definition set being based on the first word;

parse the first definition set to obtain individual first set words;

parse the second definition set to obtain individual second set words;

organize the individual first set words into at least one definition cluster;

responsive to at least one of the individual second set words matching any one of the individual first set words, merge at least a portion of the individual second set words with the first cluster, the first cluster comprising a merged definition set being distinct from the first and second definition sets;

responsive to at least one of the individual second set words not matching any of the individual first set words, merge at least a portion of the individual second set words with a second cluster, the second cluster being distinct from the first cluster;

cause, over the communication network, the electronic device to display on a screen of the electronic device to the user both the first cluster and the second cluster as definitions of the first word, the first cluster and the second cluster being visually distinct when displayed on the screen.

16. The server of claim 15, wherein at least the portion of the individual second set words has been associated with the first cluster, and wherein to cause the electronic device to display to the user at least the first cluster, the processor is configured to further cause the electronic device to display to the user, in association with the first cluster, an indication of the first source and the second source being sources for the content of the first cluster.

17. The server of claim 15, wherein the first definition set includes a definition portion and at least one auxiliary portion.

18. The server of claim 15, wherein the second definition set includes a definition portion and at least one auxiliary portion.

19. The server of claim 15, wherein to organize the individual first set words into at least one definition cluster, the processor is operable to organize the individual first set words into at least one definition cluster based on associated headings provided within the first definition set.

20. The server of claim 15, wherein the processor is configured to organize the individual first set words into at least one definition cluster responsive to a determination that the first definition set is a primary set.

21. The server of claim 20, the processor being further operable to determine if the first definition set is the primary set.

22. The server of claim 15, the processor being further operable to check if at least one of the individual second set words matches any one of the individual first set words.

* * * * *